Figure 1:
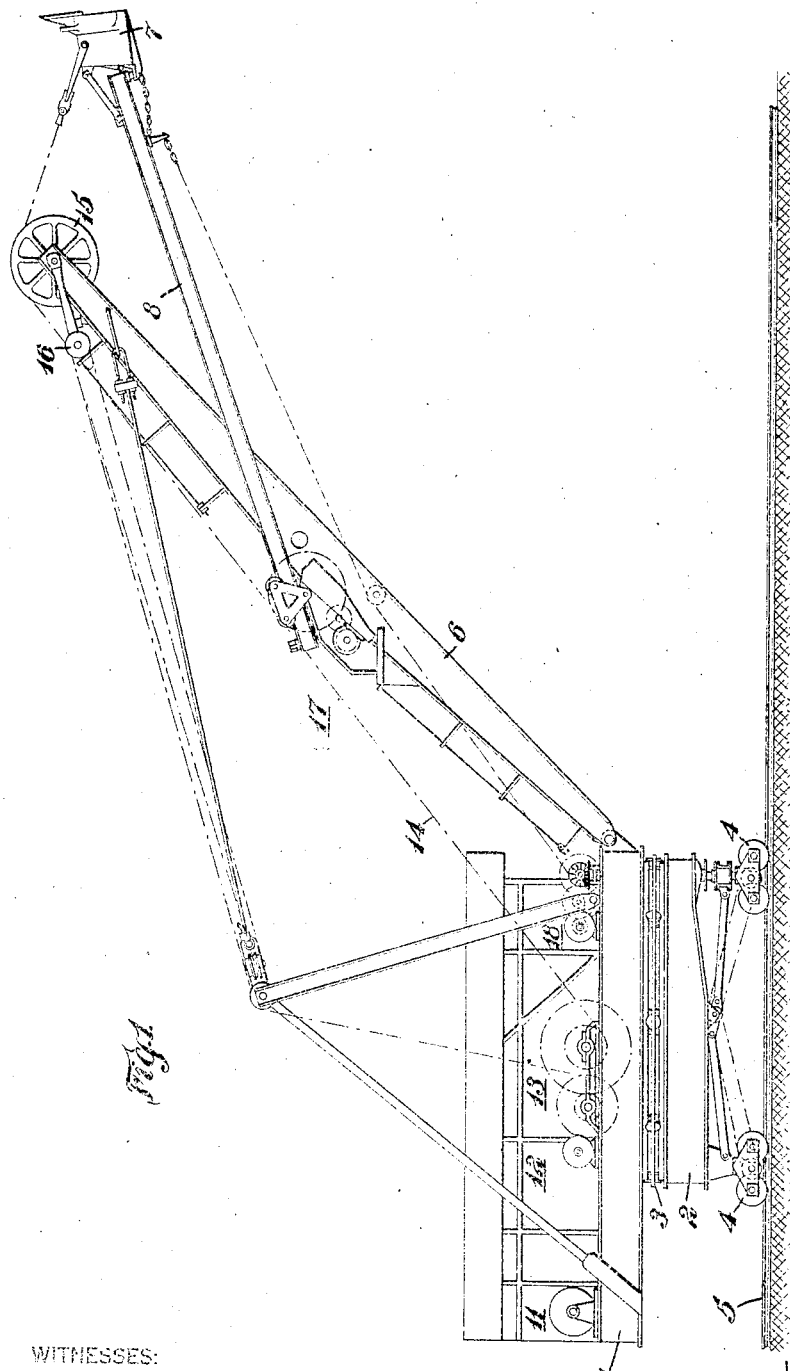

Patented July 28, 1925.

1,547,661

UNITED STATES PATENT OFFICE.

RALPH W. McNEILL AND GEORGE R. SHAW, OF WILKINSBURG, PENNSYLVANIA, ASSIGNORS TO WESTINGHOUSE ELECTRIC AND MANUFACTURING COMPANY, A CORPORATION OF PENNSYLVANIA.

SYSTEM OF CONTROL.

Application filed September 12, 1921, Serial No. 499,937. Renewed December 18, 1924.

*To all whom it may concern:*

Be it known that we, RALPH W. MCNEILL, a citizen of the United States, and a resident of Wilkinsburg, in the county of Allegheny and State of Pennsylvania, and GEORGE R. SHAW, a citizen of the United States, and a resident of Wilkinsburg, in the county of Allegheny and State of Pennsylvania, have invented a new and useful Improvement in Systems of Control, of which the following is a specification.

Our invention relates to systems of control for dynamo-electric machines and it has special relation to the electrical control of a motor-driven-shovel equipment.

One object of our invention is to provide a system for operating power shovels wherein a driving motor, of the shunt type, is connected in series relation with the supply generator, the control of the field-winding circuits being such as to vary the motor-accelerating speed, in accordance with the torque that is required by the shovel, and to effect an electrical braking action by the motor that gradually decreases with the braking speed.

A second object of our invention is to provide a system of the character set forth embodying a series field winding for the generator armature that is differentially disposed with respect to the corresponding separately excited or shunt type of field winding.

Another object of our invention is to provide a system of the type set forth wherein variation of the generator field excitation may serve to effect and control regenerative braking of the motor when the shovel load overhauls the motor.

A further object of our invention is to provide an electrical system of the above-indicated character, together with a controller for governing the operation of the machines, whereby electrical braking of the motor may be selectively effected by varying the generator voltage with the controller in a position corresponding to driving the load, or by the shovel load, overhauling the motor when the controller occupies its "off" position.

Still another object of our invention is to provide a system embodying a driving motor and switching means for governing the direction of operation thereof, together with an arrangement of relay devices and a controller to prevent the closure of one set of switching means after the other set has been closed, until the voltage of the motor decreases to a predetermined value, corresponding to a relatively low speed.

A further object of our invention is to provide a relay device for governing the excitation of the motor field winding, the relay device being provided with two actuating coils, whereby, upon the de-energization of one coil by movement of the controller to "off" position, a second coil that is connected across the motor armature serves to maintain the excitation of the motor-field-winding circuit until the motor voltage decreases to a predetermined value.

Figure 2:
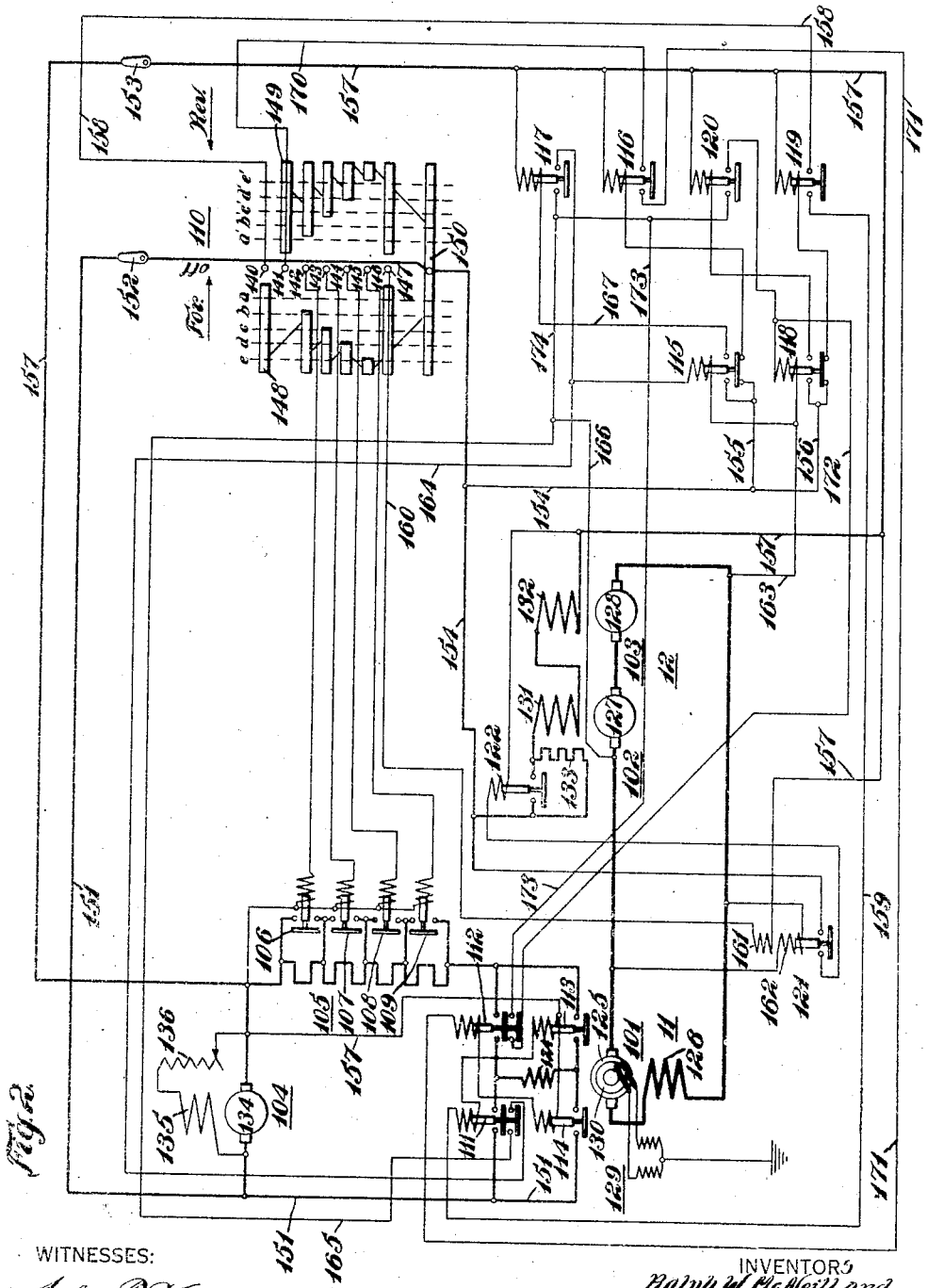
Figure 3:
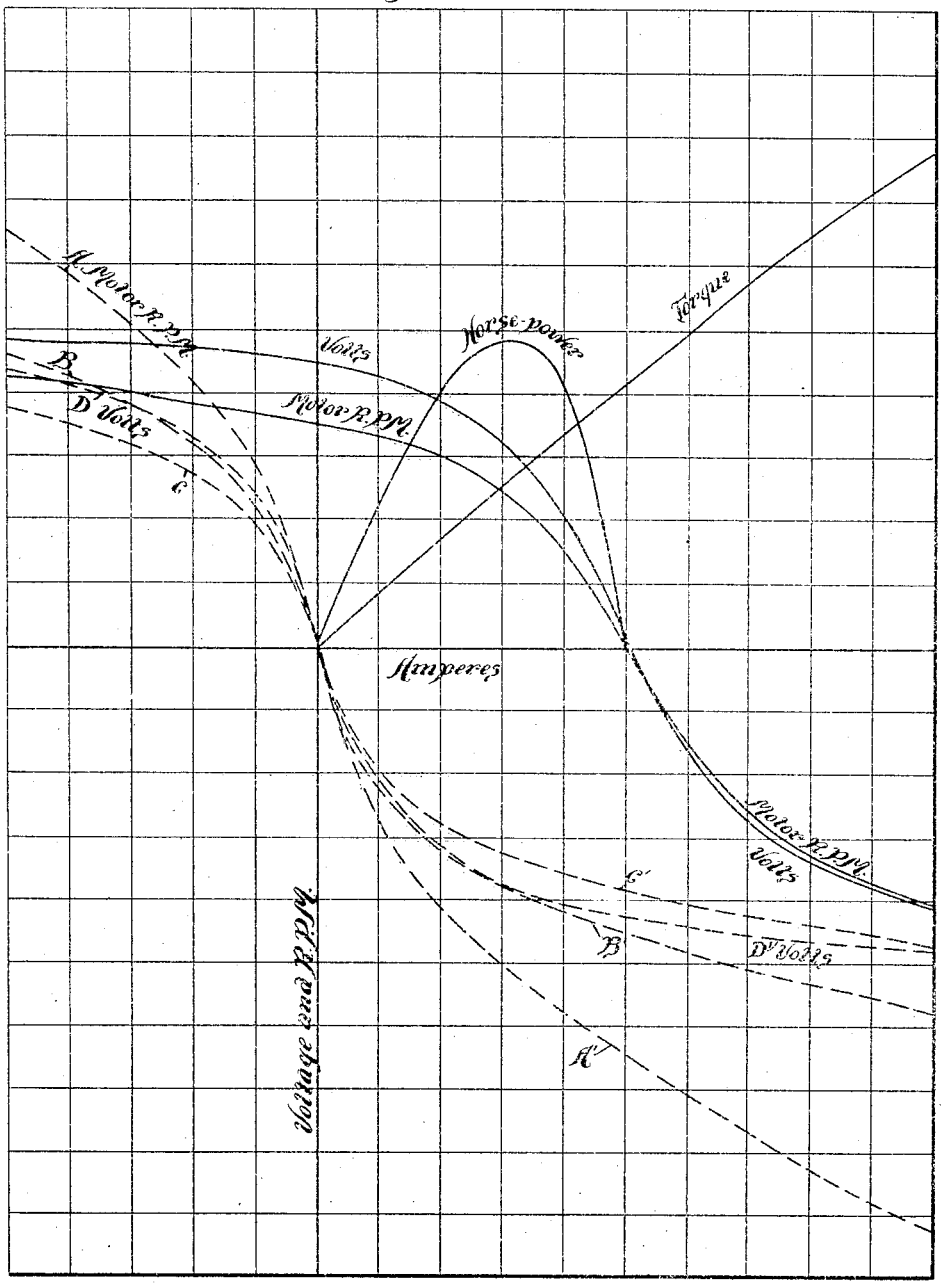

Other objects of our invention will become evident from the following detailed description, taken in conjunction with the accompanying drawings, wherein, Figure 1 is a view, in elevation, of a power shovel that is equipped with an electrical driving system, in accordance with our present invention;

Fig. 2 is a diagrammatic view of the main and the auxiliary circuits embodied in the preferred form of our system; and Fig. 3 is a curve chart graphically indicating the operating characteristics of the shovel-driving motor under various operating conditions, including two different types of electrical braking.

Referring to Figure 1 of the drawing, the power shovel here shown comprises a cab 1, which is rotatably mounted upon a suitable base 2 by means of roller bearings 3, a plurality of trucks 4 being mounted beneath the base 2 to permit operation of the shovel upon the usual track rails 5.

A swinging boom 6, a suitable dipper 7 and a dipper arm 8, which extends to an intermediate point of the boom, are arranged in a familiar manner.

The cab 1 encloses a major portion of the electrical equipment for transmitting energy to the desired parts of the shovel equipment to produce the hoisting, thrust, and swinging motions. A suitable motor-generator set 11 is mounted preferably in the end of the cab remote from the dipper and may conveniently comprise a driving synchronous motor that is supplied with energy, in the usual manner, from an external circuit, and a suitable number of direct-current generators, one of which will be specifically described in connection with Fig. 2.

The electric driving apparatus 12 for providing the hoisting motion of the dipper is located in an intermediate compartment of the cab and preferably comprises a plurality of similar direct-current motor, which will also be specifically described in connection with Fig. 2. The usual set of gear-wheels and hoisting drums 13 is provided in connection with the driving apparatus 12 to transmit energy, through the customary cables 14 and the boom wheel 15, to the dipper 7, whereby the dipper may be raised and lowered around the intermediate point of mounting on the boom 6, as desired.

The thrust motion of the dipper is governed by an electric driving apparatus 17, which preferably consists of a single motor driving suitable gear-wheels for engaging a rack surface upon the dipper arm 8, in accordance with the usual practice.

The swinging motion of the cab is controlled by means of electrical driving apparatus 18, which may comprise a single motor that is suitably connected, through bevel gearing, to drive the cab 1 rotatably with respect to the base 2 through the agency of the roller bearings 3.

The system to be described in connection with Fig. 2 relates specifically to the hoisting or digging motion of the dipper 7. However, it will be understood that the operation of the swing and the thrust machinery will be of the same general type as regards acceleration or application of power. In view of this general similarity, it is not deemed necessary to refer in detail to the control systems for the thrust driving apparatus 17 and the swing driving apparatus 18.

Referring to Fig. 2, the system here shown comprises a direct-current generator 101, constituting part of the motor-generator set 11, for supplying energy to a pair of series-connected shovel-operating motors 102 and 103, which together constitute the hoisting driving apparatus 12. An auxiliary generator or exciter 104, which preferably constitutes one element of the motor-generator set 11, is employed for exciting the generator 101 and the driving motors, a resistor 105, which may be adjusted by means of a plurality of switches 106 to 109, inclusive, being included in circuit with the exciter. A reversible multi-position controller 110 is provided for governing the operation of the supply generator and the driving motors during both the accelerating and the regenerative periods.

A plurality of sets of direction-governing switches 111 and 113, and 112 and 114, respectively, are provided for controlling the direction of energization of the separately excited or shunt type of field winding 124 for the generator 101, thereby governing the direction of operation of the shovel-driving motors, as subsequently more fully described. A plurality of relay devices 115 to 121, inclusive, are provided for automatically governing the relative operations of the sets of direction-controlling switches and of a switching device 122 that is adapted to vary the excitation of the driving motors 102 and 103, as hereinafter more fully explained.

The supply generator 101, in addition to the shunt type of field-winding 124, comprises a suitable commutator-type armature 125 and a series field-winding 126, which is differentially disposed with respect to the field winding 124. The armature 125 and the field winding 126 are connected in direct series relation, that is, in a closed loop with the commutator-type armatures 127 and 128 of the driving motors, to insure equal division of load between the motors. The generator 101 is preferably of the familiar three-wire type, a set of balancing coils 129 having a common terminal grounded, their other terminals being connected through suitable brushes to slip rings 130 on the generator armature 125. In this way, the potential to ground from any point on either of the two motors is limited to one-half of the generator voltage.

Whereas, the supply generator 101 is thus of the differentially compound-wound type, the driving motors 102 and 103 are excited solely by shunt-type field windings 131 and 132, respectively, which may be connected in series relation with a suitable resistor 133 across the terminals of the exciter 104. Equal division of load between the motors is further insured by the series relation of the field windings 131 and 132.

The exciter 104 comprises a commutator-type armature 134 and a shunt field winding 135, which is connected, through a variable resistor 136, across the terminals of the armature 134.

The controller 110 is shown as provided with an intermediate "off" position and two sets of operative positions a to e, inclusive, and a' to e', inclusive, that respectively correspond to forward and reverse direction of the shovel-driving motors, as indicated by the corresponding legends.

The controller 110 comprises a plurality of control fingers 140 to 146, inclusive, which are adapted to engage suitably configured contact segments 148 and 149, respectively corresponding to forward and reverse operations, and which are joined by a contact segment 150 that engages a control finger 147 throughout the range of operation of the controller. The positive terminal of the exciter 104 is connected, through conductor 151 and hand switch 152, to the control finger 147, whereas the negative terminal of the exciter is connected, through conductor 157 and hand switch 153, to the return side of the various coil circuits, as subsequently described in detail.

Assuming that it is desired to effect forward operation of the driving motors 102 and 103, the controller 110 may be actuated to its initial operative position $a$, whereupon a circuit is established from the positive conductor 151 through switch 152, control finger 147 and conductor 154, where the circuit divides, one branch including conductor 155, contact members of relay 115 in its lower position and actuating coil of relay 116 to the negative conductor 157, and the other branch including conductor 156, contact members of relay device 118 in its lower position, and the actuating coil of relay 119 to the negative conductor 157. The relay devices 118 and 119 respectively correspond to reverse and to forward operation of the motors, being thus permanently energized so long as the hand-operated switches 152 and 153 occupy their closed positions, unless the relay devices are opened by the action of certain other relays, as subsequently explained.

A further circuit is initially established from the contact segment 150 of the controller through contact segment 148 and control finger 140 to conductor 158, whence circuit is continued through the relay device 119, in its closed position, conductor 159 and the series-connected actuating coils of the "forward" switches 111 and 113 to negative conductor 157.

The closure of switches 111 and 113 serves to connect the positive terminal of the exciter 104 through the contact members of the switch 111 in its upper position, the shunt-type field winding 124 of the generator 101, the contact members of the supply switch 113 in its upper position and the entire resistor 105 to the negative terminal of the exciter.

The energization of the shunt-type field winding 124 serves to build up the voltage of the generator 101, in accordance with familiar principles, whereby the motor armatures 127 and 128 are supplied with energy of suitable initial accelerating voltage, and, furthermore, the differential series field winding 126 of the generator comes into play to inherently reduce surges of current by reason of its opposing action with respect to the main exciting field winding 124.

The closure of the direction-controlling switch 111 completes a circuit from one terminal of the series-connected driving motors 102 and 103 through conductor 155, actuating coil of the relay 115, conductor 164, interlock or auxiliary contact member of the switch 111 and conductors 165 and 166 to the opposite terminal of the driving motors. The relay 115 is thus actuated to its closed position to establish a circuit from the positively energized conductor 155 through the contact members of the relay 115, conductor 167 and the actuating coil of the relay 117 to the negative conductor 157.

It will be noted that the relay 117 is connected in parallel relation to the interlock on the switch 111, whereby the relay 115 is maintained in its closed position, irrespective of subsequent opening of the switch 111 when the controller 110 is moved to its "off" position.

A further operation that occurs as soon as the voltage of the driving motor builds up is the closure of the relay 121. This relay is provided with two coils, one of which, designated by the reference character 161, is energized by a circuit including the contact segment 148 and control finger 146 of the controller 110, conductor 160 and the actuating coil 161 to the negative conductor 157. It should be noted that the energization of this coil alone is sufficient to actuate the relay device. As soon as the voltage of the driving motors has increased to a predetermined value, a second actuating coil 162 for the relay 121, which coil is connected across the terminals of the driving motors, becomes energized, and the joint cumulative action of the coils 161 and 162 maintains the closure of the relay 121.

The closure of this relay completes a circuit from the positively-energized conductor 154 through the contact members of the relay 121 and the actuating coil of the switch 122 to the negative conductor 157. The closure of the switch 122 short-circuits the resistor 133 in the circuit of the field windings 131 and 132 of the driving motors, whereby full field strength is attained at the very start and is maintained during acceleration of the driving motors.

By actuating the controller 110 through its successive positions $b$, $c$, $d$ and $e$, control fingers 142 to 145, inclusive, are successively engaged by the contact segment 148 to progressively energize and close the switches 106 to 109, inclusive. In this way, the resistor 105 is gradually excluded from the circuit of the generator field winding 124, thereby correspondingly increasing the voltage that is applied to the driving motors.

Whenever it is desired to effect reversed operation of the shovel motors, the controller 110 may be actuated to its position $a'$, for example. However, such operation of the controller does not effect the opening of the direction-controlling switches 111 and 113 and the closure of the other direction-controlling switches 112 and 114 until the voltage of the driving motors has decreased to a relatively low value, thus preventing injury to the equipment by the too sudden reversal of the driving motors.

This preventive action is effected as follows: Since the relay 115 has its actuating coil connected across the terminals of the driving motors, this relay will not drop to its illustrated position until a relatively low motor voltage obtains. When the relay 115 does drop to its lower position, the previously traced circuit through the contact members thereof and the actuating coil of the relay 116 is again completed to effect the closure of the relay 116. The opening of the relay 115 also effects the deenergization of the actuating coil of the relay 117, thus causing the opening thereof. The relays 115 and 117 are thus returned to their normal positions and, as soon as the relay 116 occupies its upper or closed position, a new circuit is established from the contact segment 149 of the controller 110 through control finger 141, conductor 170, contact members of the relay 116, conductor 171 and the series-connected actuating coils of the direction-controlling switches 112 and 114 to the negative conductor 157.

The direction of energization of the generator field winding 124 is thus reversed in accordance with well-known principles, whereby the direction of energization of the motor armatures 127 and 128 is also reversed.

As soon as the motor voltage has increased to the critical value, a circuit is established from conductor 163 through the actuating coil of relay 118, conductor 172, interlock or auxiliary contact member of the switch 112, in its closed position, and conductors 173, 174 and 166 to the opposite side of the driving motors. The relay 118 is thus raised to its upper position to complete a circuit from the positively energized conductor 156 through the contact members of the relay 118 and the actuating coil of the relay 120 to the negative conductor 157.

The relay 120 serves to bridge the interlock on the direction-controlling switch 112 by directly joining one terminal of the coil of the relay 118 to conductor 174. In this way, the relay 118 is maintained closed, irrespective of subsequent opening of the direction-controlling switch 112.

Otherwise, the operation of the system is the same as that previously described, since the contact segment 149 of the controller 110 corresponds, in form, to the contact segment 148.

It will be appreciated without detailed description that, in case the controller 110 is suddenly actuated from a reverse to a forward position, the set of relay devices 118, 119 and 120 operate in the same manner as the relays 115, 116 and 117 to prevent the closure of the direction-controlling switches 111 and 113 until the voltage of the main motors 102 and 103 has decreased to a predetermined value.

In either case, the field windings of the motors have their energization reduced when the controller is returned to its "off" position in order to decrease the heating of the field windings 131 and 132, which would occur to an undue extent if these windings were left connected permanently across the exciter 104 to receive the full voltage thereof. However, such reduction in the field energization does not occur until the voltage of the main motors has dropped to a certain value, thereby insuring full field energization during the decelerating period.

This result is obtained by reason of the action of the two actuating coils 161 and 162 of the relay 121. Although the joint action of the two coils was employed to close the relay and maintain it closed, as previously described, the winding 162, which is connected across the terminals of the main motors, is adapted to alone maintain the relay in its closed position, in accordance with familiar principles. Consequently, although the coil 161 becomes de-energized when the controller is thrown to its "off" position, the relay 121 does not open until the voltage of the main motors decreases to a predetermined value. At that time, therefore, the actuating coil of the switch 122 becomes de-energized to allow the reinsertion of the resistor 133 in circuit with the shunt-type field windings 131 and 132 of the driving motors, to decrease the heating thereof.

Regeneration may be selectively effected by either one of two methods without employing any resistors to absorb power. In the first place, if it is desired to lower the load after the controller has been actuated to its full forward-running or hoisting position $e$, for example, the controller 110 may be actuated to its "off" position to stop the motors and, upon application of the mechanical brakes, the load will be held in its elevated position.

For lowering under the control of the operator, the controller 110 may be first actuated to its initial reverse or lowering position $a'$, whereupon the desired reversal of voltage of the main motor armatures 127 and 128 will occur in the manner previously described. The necessary starting or "kickoff" action is thus obtained. However, if desired, the controller may be actuated to any of its reverse positions $a'$ to $e'$, inclusive, to provide a corresponding difference in the rate of retardation, the position $e'$ affording the highest braking rate.

The characteristics of the generator and motor armatures in the closed main circuit, including the differential action of the series field winding for the supply generator, are such as to prevent undue surges of current during the braking period, and, moreover, to normally maintain the voltage of the motors, which are now driven as generators by the descending load of soil, or other material, slightly above that of the generator.

The rate of retardation may be varied within relatively wide limits by manipulating the controller to other positions on the lowering side, as desired. In this way, the generator 101 is driven as a motor to return energy to the supply circuit through its normally driving machine and thus effect true regenerative braking of the equipment.

The load may be safely lowered by means of the electrical braking just described, or, if desired, the following method may be employed: Assuming that the controller again occupies its forward running position e, upon releasing the mechanical brakes and actuating the controller to its "off" position, the descending load will gradually overhaul the motor, which will exert the well-known electrical braking or regenerating action that such operation causes. The braking effort may be regulated in this case by variably energizing the generator field winding in the direction corresponding to hoisting, as will be readily understood.

By reason of the employment of the shunt driving motors 102 and 103, therefore, the operator may choose between the two different types of electrical braking, whereas, if a series driving motor were employed, only the latter, or overhauling braking action, would be possible.

The previously described operations of the main driving motors are graphically indicated by the curves of Fig. 3. The curves marked "Horse power", "Torque", "Volts" and "Motor R. P. M." in the first quadrant of the curve chart are of a familiar character setting forth the operating characteristics of the shunt motor. From these curves it will be seen that, although the shunt motor, in general, is a constant-speed machine, nevertheless, the accelerating speed of the driving motors will not be governed solely by the variation of supply-generator voltage, but the speed will also vary in accordance with the torque that is required by the shovel throughout its complete hoisting operation. In addition, the characteristics of the generator are evidently such that it will be impossible to overload the motors or overstress the boom.

Furthermore, regenerative braking of the first type set forth above, that is, weakening the generator field excitation in such manner as to maintain the generator voltage below the voltage of the load-driven motors, is indicated by the curves in the second quadrant of the curve chart. Curve A represents motor R. P. M. for a given condition of the generator excitation by means of the shunt-type field winding 124 and a relatively low motor excitation by means of the shunt-type field windings 131 and 132. Curves B and C indicate motor operation for similar generator excitation and gradually increasing motor excitation. Curve D represents the regenerative voltage. From these curves it will be noted that the electrical action of the shovel motors gradually decreases with the braking speed.

If the second type of electrical braking is desired, namely, that caused by the overhauling action of the loaded shovel, the curves shown in the fourth quadrant of the chart apply. These curves are labeled A', B', C' and D' and respectively correspond to the previously indentified curves A, B, C and D.

Consequently, by reason of the employment of a driving motor of the shunt type, electrical braking thereof under conditions of lowering a loaded shovel may be effected at will, according to either the second quadrant or the fourth quadrant set of curves that are illustrated in Fig. 3, whereas, in the case of a series driving motor, second quadrant operation is impossible by reason of the different speed-torque characteristics of the machines.

We do not wish to be restricted to the specific structural details, circuit connections, or arrangement of parts herein set forth, as various modifications thereof may be made without departing from the spirit and scope of our invention. We desire, therefore, that only such limitations shall be imposed as are indicated in the appended claims.

We claim as our invention:

1. The combination with a power shovel, of driving means therefor comprising a generator and a motor armature connected in series relation, means for operatively connecting said motor armature to said shovel, a series and a shunt-type field winding for exciting said generator armature, a second shunt-type field winding for alone exciting said motor armature and means comprising said series field winding for varying the effective excitation of said shunt-type field windings to vary the motor accelerating speed in accordance with the torque required by the shovel and to effect an electrical braking action by said motor that gradually decreases with the braking speed.

2. The combination with a power shovel, of driving means therefor comprising a compound wound generator and a plurality of motor armatures connected in series relation, means for operatively connecting said motor armatures to said shovel, a plurality of shunt-type field windings for respectively alone exciting the motor armatures and means for varying the excitation of at least one of said shunt-type field windings as the effective excitation of said generator changes to vary the accelerating speed of the motors in accordance with the torque required by the shovel and to effect an electrical braking action by said motors that gradually decreases with the braking speed.

3. The combination with a power shovel, of driving means therefor comprising a generator and a plurality of motor armatures connected in series relation, means for operatively connecting said motor armatures to said shovel, a shunt-type and a differentially wound series field winding for exciting said generator armature, a plurality of shunt-type field windings for respectively alone exciting the motor armatures and means including an exciter and said series field winding for varying the effective excitation of the generator shunt-type field winding to vary the accelerating speed of the motors in accordance with the torque required by the shovel and to effect an electrical braking action by said motors.

4. The combination with a power shovel and a motor armature operatively connected thereto, of a generator armature electrically connected to said motor armature, shunt-type field windings for respectively exciting said armatures, a series field winding for the generator armature and means for varying the voltage impressed upon the motor armature by adjusting the excitation of certain of said field windings for governing the speed of the motor armature under accelerating conditions and for governing the current traversing said motor armature under electrical braking conditions.

5. The combination with a power shovel and a plurality of motor armatures operatively connected thereto, of a generator armature connected in series relation with said motor armatures, shunt-type field windings for respectively exciting said armatures, a differentially wound series field winding for the generator armature and means for varying the voltage impressed upon the motor armatures by adjusting the excitation of the generator field windings for governing the speed of the motor armatures under accelerating conditions and for governing the current traversing said motor armatures under electrical braking conditions.

6. The combination with a power shovel and a plurality of motor armatures operatively connected thereto, of a generator armature connected in series relation with said motor armatures, shunt-type field windings for respectively exciting said armatures, and a series field winding for said generator armature differentially disposed with respect to the corresponding shunt-type field winding.

7. The combination with a power shovel and a plurality of series related motor armatures operatively connected thereto, of a generator armature connected in series relation with said motor armatures, series related shunt-type field windings for respectively alone exciting said motor armatures, and differentially related shunt-type and series field windings for exciting said generator armature.

8. The combination with a power shovel and a motor armature operatively connected thereto, of a compound wound generator having an armature electrically connected to said motor armature, a shunt-type field winding for alone exciting said motor armature, and means for controlling the effective generator field excitation whereby regenerative braking of the motor may be effected when the shovel load overhauls the motor.

9. The combination with a power shovel and a motor armature operatively connected thereto, of a compound wound generator having an armature electrically connected to said motor armature, a shunt-type field winding for alone exciting said motor armature, and a reversible controller for varying the effective generator field excitation to maintain the generator voltage below the voltage generated by the motor under shovel-load-lowering conditions, whereby regenerative braking of the motor may be effected when the shovel load overhauls the motor.

10. The combination with a power shovel and a plurality of motor armatures operatively connected thereto, of a differentially compound wound generator having an armature connected in series relation with said motor armatures, a plurality of series-related shunt-type field windings for respectively alone exciting said motor armatures, and a reversible controller for varying the effective generator field excitation to maintain the generator voltage below the voltage generated by the motors under shovel-load-lowering conditions, whereby regenerative braking of the motors may be effected when the shovel load overhauls the motors.

11. The combination with a power shovel and a motor armature operatively connected thereto, of a differentially compound wound generator having an armature electrically connected to said motor armature, a shunt-type field winding for exciting said motor armature, and a controller for governing the operation of the machines, and means whereby electrical braking of the motor may be selectively effected by varying the effective generator voltage with the controller in a position corresponding to driving the load or by the shovel load overhauling the motor when the controller occupies its "off" position.

12. The combination with a power shovel and a motor armature operatively connected thereto, of a compound wound generator having an armature electrically connected to said motor armature, a shunt-type field winding for alone exciting said motor armature, and a reversible controller for governing the operation of said machines, and means whereby electrical braking of the motor may be selectively effected by varying the effective generator field excitation to maintain the generator voltage below the voltage generated by the motor under shovel-load-lowering conditions with the controller in an operative position or by the shovel load overhauling the motor when the controller occupies its "off" position.

13. The combination with a power shovel and a plurality of motor armatures operatively connected thereto, of a compound wound generator having an armature connected in series relation with said motor armatures, a plurality of series-related shunt-type field windings for respectively alone exciting said motor armatures, and a reversible controller for governing the operation of said machines, and means whereby electrical braking of the motors may be selectively effected by varying the effective generator field excitation to maintain the generator voltage below the combined voltage generated by the motors under shovel-load-lowering conditions with the controller in an operative position or by the shovel load overhauling the motor when the controller occupies its "off" position.

14. In a system of control, the combination with a driving motor and switching means for governing the direction of operation of said motor, of a plurality of normally energized switches corresponding to the respective directions of motor operation, a controller for effecting the closure of a selected set of said switching means, a relay having a coil thereupon connected across said motor, and means for preventing the closure of another set of said switching means until said relay drops to its low-voltage position.

15. In a system of control, the combination with a driving motor and switching means for governing the direction of operation of said motor, of a plurality of normally energized relays corresponding to the respective directions of motor operation, a controller for effecting the closure of a selected set of said switching means through one of said relays, another relay having a coil thereupon connected across said motor, means governed by said relay for establishing a holding circuit therefor independent of said set of switching means, and means for preventing the closure of another set of said switching means until said other relay drops to its low-voltage position.

16. In a system of control, the combination with a driving motor and a plurality of pairs of switches for governing the direction of operation of said motor, of a pair of normally energized relays corresponding to the respective directions of motor operation, a reversible controller for effecting the closure of a selected pair of said switches through one of said relays, a third relay having a coil connected across said motor by an interlock upon one of said switches, a fourth relay governed by the operation of said coil for bridging said interlock and for effecting the opening of the remaining normally energized relay, whereby the operation of the controller to a reversed position is ineffective to close the remaining pair of said switches until said third relay drops to its low-voltage position to permit the fourth relay to open and thereby effect the re-energization of said remaining normally energized relay.

17. In a system of control, the combination with a driving motor having an armature and a field winding, of means for modifying the effective flux of the field winding, a plural coil relay for governing said modifying means and having one coil connected across the motor armature, and a controller for governing another coil to effect operation of said modifying means by the joint action of said coils, whereby upon the de-energization of one coil by movement of the controller to "off" position, the coil connected across the motor armature serves to maintain the condition of said modifying means until the motor voltage decreases to a predetermined value.

18. In a system of control, the combination with a driving motor having an armature and a field winding, of a resistor in circuit with said field winding and a plural-coil relay for governing the operation of said resistor, said relay having one normally energized coil and another coil connected across the motor, the sole action of one coil being necessary to close the relay but the action of the last-named coil alone being sufficient to hold the relay closed, whereby said coil serves to maintain the normal operating condition of said resistor until the motor voltage decreases to a predetermined value.

19. In a system of control, the combination with a driving motor having an armature and a field winding, of a resistor in series relation with said field winding, a normally open switch connected to the terminals of said resistor, a plural-coil relay for governing said switch and having one coil connected across the motor armature, and a controller for governing another coil to effect closure of said switch by the sole action of said other coil, whereby upon the de-energization of one coil by movement of the controller to "off" position, the coil connected across the motor armature serves to maintain said switch closed to short-circuit said resistor until the motor voltage decreases to a predetermined value.

20. In a system of control, the combination with a dynamo-electric machine and means for governing the direction of operation thereof, of a plurality of normally energized switches corresponding to the respective direction of machine operation, means for effecting the operation of a selected portion of said governing means, and means for preventing the operation of another portion of said governing means until a predetermined machine voltage obtains.

21. The combination with a power shovel, of driving means therefor comprising a generator and a motor armature connected in series relation, means for operatively connecting said motor armature to said shovel, a series and a shunt-type field winding for exciting said generator armature, a field winding for alone exciting said motor armature and means comprising said series field winding for varying the effective excitation of said field windings to vary the motor accelerating speed in accordance with the torque required by the shovel and to effect an electrical braking action by said motor that gradually decreases with the braking speed.

22. The combination with a power shovel, of driving means therefor comprising a generator and a plurality of motor armatures connected in series relation, means for operatively connecting said motor armatures to said shovel, a shunt-type and a differentially wound series field winding for exciting said generator armature, and means including an exciter and said series field winding for varying the effective excitation of the generator shunt-type field winding to vary the accelerating speed of the motors in accordance with the torque required by the shovel and to effect an electrical braking action by said motors.

23. The combination with a power shovel and a motor armature operatively connected and a motor armature operatively connected thereto, of a generator armature electrically connected to said motor armature, field windings for respectively exciting said armatures, a series field winding for the generator armature, and means for varying the voltage impressed upon the motor armature by adjusting the excitation of certain of said field windings for governing the speed of the motor armature under accelerating conditions and for governing the current traversing said motor armature under electrical braking conditions.

24. The combination with a power shovel and a motor armature operatively connected thereto, of a generator armature connected in series relation with said motor armature, shunt-type field windings for respectively exciting said armatures, a differentially wound series field winding for the generator armature, and means for varying the voltage impressed upon the motor armature by adjusting the excitation of the generator field windings for governing the speed of the motor armature under accelerating conditions and for governing the current traversing said motor armature under electrical braking conditions.

25. The combination with a power shovel and a plurality of motor armatures operatively connected thereto, of a generator armature connected in series relation with said motor armatures, main field windings for respectively exciting said armatures, and a field winding for said generator armature differentially disposed with respect to the corresponding main field winding.

26. The combination with a power shovel and a motor armature operatively connected thereto, of a compound wound generator having an armature electrically connected to said motor armature, a shunt-type field winding for exciting said motor armature, and means for controlling the effective generator field excitation whereby regenerative braking of the motor may be effected when said motor is plugged.

27. The combination with a power shovel and a motor armature operatively connected thereto, of a compound wound generator having an armature electrically connected to said motor armature, a shunt-type field winding for alone exciting said motor armature, and a reversible controller for varying the effective generator field excitation and means co-operating with said controller for limiting the current of regeneration when said generator excitation is suddenly reversed.

28. The combination with a power shovel and a motor armature operatively connected thereto, of a compound wound generator having an armature electrically connected to said motor armature, a shunt-type field winding for alone exciting said motor armature, and a reversible controller for varying the effective generator field excitation and means rendered effective when said controller is abruptly reversed for limiting the current of regeneration.

In testimony whereof, we have hereunto subscribed our names this 7th day of September, 1921.

RALPH W. McNEILL.
GEORGE R. SHAW.